United States Patent Office 3,421,821
Patented Jan. 14, 1969

3,421,821
COLOR SPECTRUM ANALYZER
Patrick A. Alessi, 105 Beaufort Ave.,
Needham, Mass. 02192
Filed Dec. 10, 1964, Ser. No. 417,387
U.S. Cl. 356—186          5 Claims
Int. Cl. G01j 3/00; G01j 3/48; G01j 3/46

ABSTRACT OF THE DISCLOSURE

A hand-held color analyzer measures the reflectance from a specimen to determine its color value. The analyzer has a main body in the form of a hand-held gun containing a null balancing circuit and resistance adjustments to establish desired reference conditions; it also has a detachable probe containing a light source, a photodetector, and an optical filter, these components being mounted adjacent a forward aperture in the probe for positioning adjacent a specimen whose color value is to be determined. The probe is readily replaced with others of different optical characteristics in order to extend the range of the instrument over a broad color spectrum when desired. Relative color values of two or more specimens are readily determined by means of a single switch and a pair of adjustable resistors mounted on the main body, one of the resistors providing a direct digital indication of the desired relative values when appropriately adjusted.

---

The color of a sample material to be analyzed may be measured in a variety of ways. The basic technique involves the measurements of the reflectivity of the sample at one or more wavelengths when the sample is illuminated by a given light source. Among the instruments which perform these measurements are spectrophotometers which measure the reflectivity of the sample over a broad range of wavelengths, and colorimeters, which measure the reflectivity only within selected bands of the spectral response curve. These instruments may broadly be termed color analyzers and as such are known devices.

An example of a color analyzer is given in U.S. Patent No. 2,358,020 issued Sept. 12, 1944, to George E. Miller. Analyzers such as disclosed therein, however, are often impractical to use in that the calibration controls are generally placed at a distance from the housing containing the optical pickup, thus precluding rapid calibration when surfaces containing a variety of color values are to be examined. Further, the area of the surface to be examined which is scanned by such analyzers is often very large, and the local color variations within a given area are not discriminately determined.

Accordingly, it is an object of my invention to provide a simple, lightweight color spectrum analyzer which can be rapidly and accurately calibrated. Further, it is an object of my invention to provide a color spectrum analyzer capable of examining the color of a very small area.

In color analysis, it is often desirable to match the characteristics of the optical detection system with the characteristics of the material to be analyzed. This may be done by using a different combination of light source, photocell, and optical filter for each of the materials to be analyzed. One important object of my invention is to provide a color spectrum analyzer in which the optical characteristics of the analyzer may be rapidly changed to effect the desired matching between the analyzer and the material to be analyzed.

It is often found desirable to compare the color of a sample surface or material with the color of a standard reference material. Such an application occurs, for example, in the field of dentistry, where the color of a false tooth is to be matched to the color of the surrounding natural teeth for cosmetic purposes. The color sensitive detection unit must be capable of determining the color of localized segments of an individual tooth, since the color of the tooth may vary from one area to another. Further, that portion of the color analyzer which comes into contact with the tooth itself must be capable of removal for subsequent sterilization. An important feature of my invention resides in providing a color spectrum analyzer in which the color detecting portion of the system is mounted in a detachable, interchangeable head or probe which may quickly and easily be removed and replaced by a similar unit.

In accordance with the present invention, the foregoing and other objects are achieved by providing a color spectrum analyzer having a main body, preferably in the form of a handheld gun, and a probe detachably connected thereto. The probe contains a light source for illuminating the material to be analyzed; an optical detector, for example, a photocell; and an optical filter mounted in front of the photocell. The probe has an opening or aperture at one end thereof, the light source, filter, and photocell being mounted at predetermined distances behind the iris or opening. The main body of the analyzer contains a source of power for operating the light source or lamp, and an electrical bridge circuit connected across the power source for measuring the current through the photocell which forms part of one arm of the bridge circuit. Calibration means, for example, variable resistances, are also mounted in the main body of the analyzer to provide control of the intensity of the light emitted from the light source and also to provide a means of nulling-out or balancing the bridge circuit. The balancing resistor may take the form of a precision calibrated dial potentiometer having a digital read-out in order that the color of the surface to be analyzed may be read directly in digital form when the bridge circuit is balanced.

The objects, features and advantages of my invention will more readily be understood and appreciated from the following detailed description of a preferred embodiment thereof selected for purposes of illustration and shown in the accompanying drawing, in which:

FIG. 3b is a side view of the probe shown in FIG. 3a.

Figure 1:
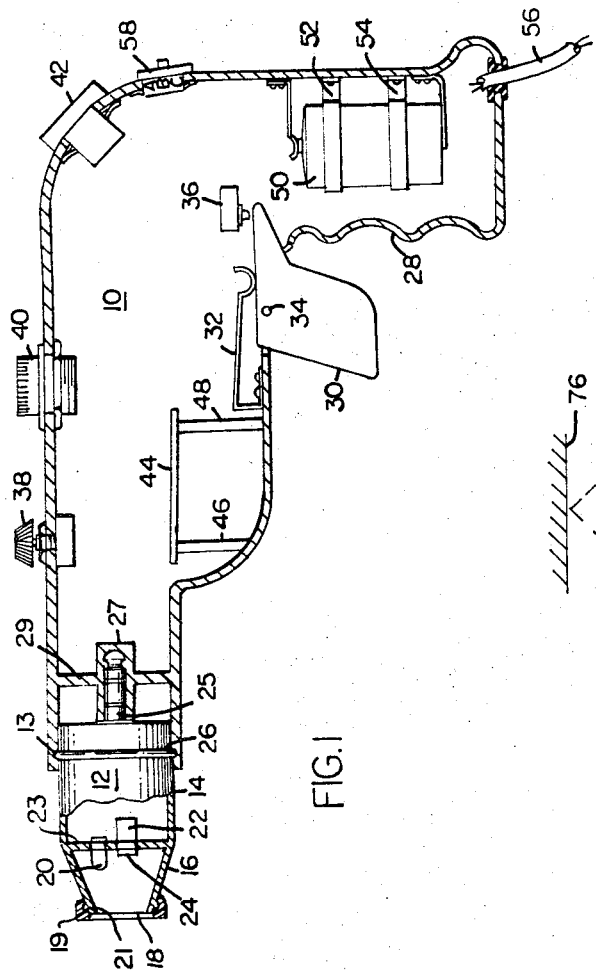
FIG. 1 is a view in side elevation of a color analyzer constructed in accordance with my invention.
Figure 2:
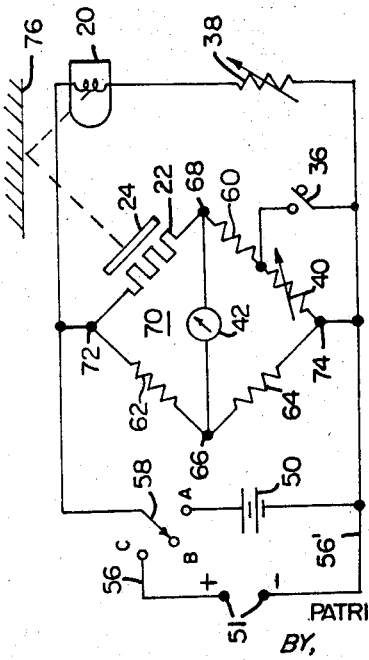
FIG. 2 is a schematic diagram of the electrical circuitry of the analyzer shown in FIG. 1.

Referring now to FIG. 1, there is shown a preferred embodiment of my improved color analyzer, including a main body generally denoted at 10, and a probe detachably connected to the main body and generally indicated at 12. The probe 12 may have a generally cylindrical shape along the stem portion 14 thereof, the stem being tapered along the frontal portion 16 to form an iris or opening 18. A lamp 20 is mounted toward the frontal portion of the stem and facing the iris 18. Closely adjacent the light source 20 is an optical detector 22, for example, a photocell, immediately in front of which is an optical filter 24. The light source, filter, and photocell are mounted in the probe 12 by means of the plate 23. The probe 12 is mechanically connected to the main body 10 by means of a lip 26 which extends circumferentially around the probe and which is fitted by manual pressure into a groove 13 which extends circumferentially around the inside surface of the main body 10. It will be apparent that other types of mechanical connections may be employed to connect the probe 12 to the main body 10 such that the probe may be rotated with respect to the main body and the particular type of connection shown in FIG. 1 is intended to be illustrative only.

Mounted on the frontal portion 16 of the probe 12

Jan. 14, 1969  P. A. ALESSI  3,421,821
COLOR SPECTRUM ANALYZER
Filed Dec. 10, 1964

INVENTOR
PATRICK A. ALESSI
BY,
Kenway, Jenney & Hildreth
ATTORNEYS

It will be observed that the construction of the analyzer as shown in FIG. 1 easily lends itself to a rapid interchange of probes containing the optical detection unit. Further, the positioning of this unit within the probe itself allows a high repeatability of measurements on a given material in that the probe itself may be touched directly to the surface whose color is to be measured, thus maintaining a fixed distance between the surface of the material and the photocell itself. The positioning of the probe against a surface also serves to maintain a fixed level of illumination for the surface and to reduce stray or incident light from other than the light source.

Figure 3A:
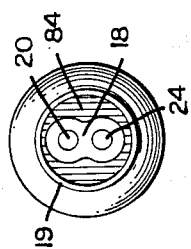
FIG. 3a is a front view of a probe for use with my invention.
Figure 3B:
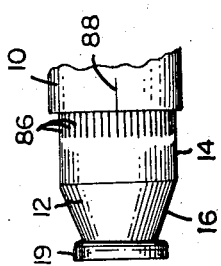

The probe 12 in FIG. 1 has illustratively been shown as being comprised of a stem portion 14 having a cylindrical shape and a frontal portion 16 which is tapered toward the iris 18. It will be apparent to those skilled in the art that the exact shape of the probe is not critical and that other shapes may be used to fit the particular needs of the user. Thus referring to FIG. 3a, there is shown a frontal view of probe which is partcularly useful for the examination of small areas. The iris 18 is formed from an opaque mask 84 which is positioned within the probe 12 and in front of the light source 20 and filter 24. With the analyzer pressed against the surface to be examined, the probe is rotated to thereby expose varying areas of the surface to the light source and photocell for analysis. To assist the user in selecting a given angular orientation, the probe 12 may have angular markings 86 around the circumference thereof, a corresponding reference marker 88 being placed on the forward portion of the main body 10 as shown in FIG. 3b.

Other modifications which readily suggest themselves may be made without departing from the scope of my invention. Thus, the frontal portion 16 of the probe 12 may be shaped to form the desired iris configuration and the mask 84 may be dispensed with where desired. Further, the inner surface of the frontal portion 16 of the probe 12 may be blackened in order to prevent the direct reflection of light from the light source 20 and the inner surface onto the photocell 22. Alternatively, a baffle plate might be inserted parallel with, and between, the light source and the photocell and filter combination for the same purpose. This will ensure that only that light which has been reflected from the sample being analyzed will enter the photocell 22. It might be noted that the characteristics of the filter 24 may also serve to reduce some of the light that may otherwise be directly reflected from the light source and the probe onto the photocell.

It will be seen that I have provided a color analyzer that is capable of rapid and efficient operation. The measuring circuit is of simple design, and may easily be operated by inexperienced persons. By providing for the use of interchangeable probes, I have provided a color analyzer whose optical detection unit may rapidly and easily be changed to match the characteristics of the sample being analyzed. Further, the interchangeability of the turret allows its removal for sterilization where medical purposes so require. The placing of the light source, filter, and photocell close to the iris or opening at the frontal portion of the turret allows the illumination and examination of a very small area, reduces the power required to operate the analyzer, and allows great reproducibility in measurements by maintaining a constant spacing between the optical detection unit and the sample to be analyzed and by reducing the ambient lighting.

Although a single measurement will be sufficient to match the color of a pair of objects in most cases, it may be found desirable to obtain several measurements with different probes in some instances, the optical detection system in each probe being especially adapted to examine a particular band of the light spectrum. My invention facilitates such measurements by permitting rapid interchange of probes and by providing a simple calibration system for the electrical circuitry of the color analyzer.

It will thus be seen that the objects set forth above, among those apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A hand-held color analyzer for measuring reflectance from a specimen adjacent which said analyzer is positioned comprising, in combination, a main body having a probe electrically and mechanically detachably connected thereto, said probe having an aperture at one end thereof for positioning adjacent said surface and having a light source and an optical detector mounted within the body of said probe adjacent said aperture, said main body including means for supplying electrical current to said light source, means for controlling the magnitude of said current, electrical measuring means responsive to the signal from the optical detector when said detector is illuminated by light energy from the surface to be analyzed, and means cooperating with mating means on said probe to provide severable electrical interconnections between said electrical current means and said measuring means on the one hand and said light source and said detector on the other hand when said probe is mechanically fitted to said main body whereby the signal from said detector is measured by said measuring means to provide an indication of the color of the sample to be analyzed.

2. The combination defined in claim 1 wherein said electrical measuring means includes an electrical bridge circuit, said optical detector being included in said bridge circuit as a first arm of said bridge, the second arm of said bridge having a variable resistor included therein, the remaining arms of said bridge being formed by a pair of fixed resistors, said measuring means including switching means for removing said variable resistors from the circuit when said switching means is in a first state.

3. A color spectrum analyzer for providing an indication of the relative color values of pair of specimens, said analyzer comprising, in combination, a hand-held main body having a probe mechanically and electrically detachably connected thereto, said probe having an aperture at one end thereof for positioning adjacent the surface to be examined and means cooperating with mating means on said main body for concurrently detachably connecting said probe both mechanically and electrically to said body at the other end thereof, said probe having mounted therein an optical detection unit, said unit including a light source and a photocell and being spaced a predetermined distance from said aperture, said main body including an electrical meter, a first variable resistance for adjusting the current through said light source to obtain a first reference value from said meter when said aperture is positioned adjacent a first of said specimens, an electrical measuring circuit including a bridge circuit having a second variable resistance for adjusting the current through said photocell and calibrated to provide a direct numerical indication of the departure of said meter from said first value when said aperture is positioned adjacent a second of said specimens, means electrically connecting said photocell, said meter, and said second variable resistance in separate branches of said bridge circuit, said meter and said first and second variable resistances being mounted on said main body and means for connecting a source of electrical potential to said light source and said bridge circuit.

4. A color analyzer according to claim 1 in which said optical detector includes a light-responsive transducer and an optical filter positioned intermediate said transducer and the surface being analyzed to filter the light reflected from said surface to said transducer.

5. A color analyzer according to claim 1 in which said probe is connected to said main body by means of a pressure fit between mating portions on said probe and said body whereby said probe may be rapidly mechanically and electrically attached to, and detached from, said body.

References Cited

UNITED STATES PATENTS

| | | | |
|---|---|---|---|
| 1,383,606 | 7/1921 | Davis | 240—3.1 |
| 2,358,020 | 9/1944 | Miller. | |
| 2,420,716 | 5/1947 | Morton et al. | 250—227 |
| 2,587,602 | 3/1952 | Crandell. | |
| 2,774,961 | 12/1956 | Orlando. | |
| 2,833,915 | 5/1958 | Beecher | 240—3.1 |
| 2,840,146 | 6/1958 | Ray. | |
| 2,843,112 | 7/1958 | Miller. | |
| 3,029,348 | 4/1962 | Heinz. | |
| 3,130,317 | 4/1964 | Connelly et al. | 250—227 |
| 3,164,663 | 1/1965 | Gale. | |

JEWELL H. PEDERSEN, *Primary Examiner.*

W. A. SKLAR, *Assistant Examiner.*

U.S. Cl. X.R.

356—195, 209